United States Patent [19]  [11] 3,894,660
Snyder  [45] July 15, 1975

[54] CALIBRATED LIVESTOCK FEEDER
[76] Inventor: Howard N. Snyder, P.O. Box 42, Pilger, Nebr. 68768
[22] Filed: Nov. 13, 1974
[21] Appl. No.: 523,437

[52] U.S. Cl. .............. 222/170; 119/52 B; 222/176
[51] Int. Cl.² ......................................... B67D 5/64
[58] Field of Search .......... 222/162, 169, 170, 176, 222/160, 167; 119/52 B

[56] References Cited
UNITED STATES PATENTS
325,269  9/1885  Peabody ............................. 222/170
535,432  3/1895  Wilson ............................... 222/170

Primary Examiner—Stanley H. Tollberg
Assistant Examiner—Hadd Lane
Attorney, Agent, or Firm—Hugh H. Drake

[57] ABSTRACT

A calibrated livestock feeder includes a feed-containing drum supported to be driven in rotation about its longitudinal centerline. A shelf projects inwardly from one side of a longitudinal opening in the wall of the drum. A flap hingedly mounted to one side of the opening is resiliently biased so as normally to close the opening. During a limited portion of each revolution of the drum, beginning after the point at which the shelf first slants downwardly toward the opening and ending before the point at which the shelf then comes into a horizontal position, the flap is cammed outwardly so that feed, captivated by the shelf during the previous drum revolution, is dispensed by gravity. Associated with the shelf is an element for adjustably determining the amount of feed that is captivated by the shelf during each revolution of the drum.

12 Claims, 6 Drawing Figures

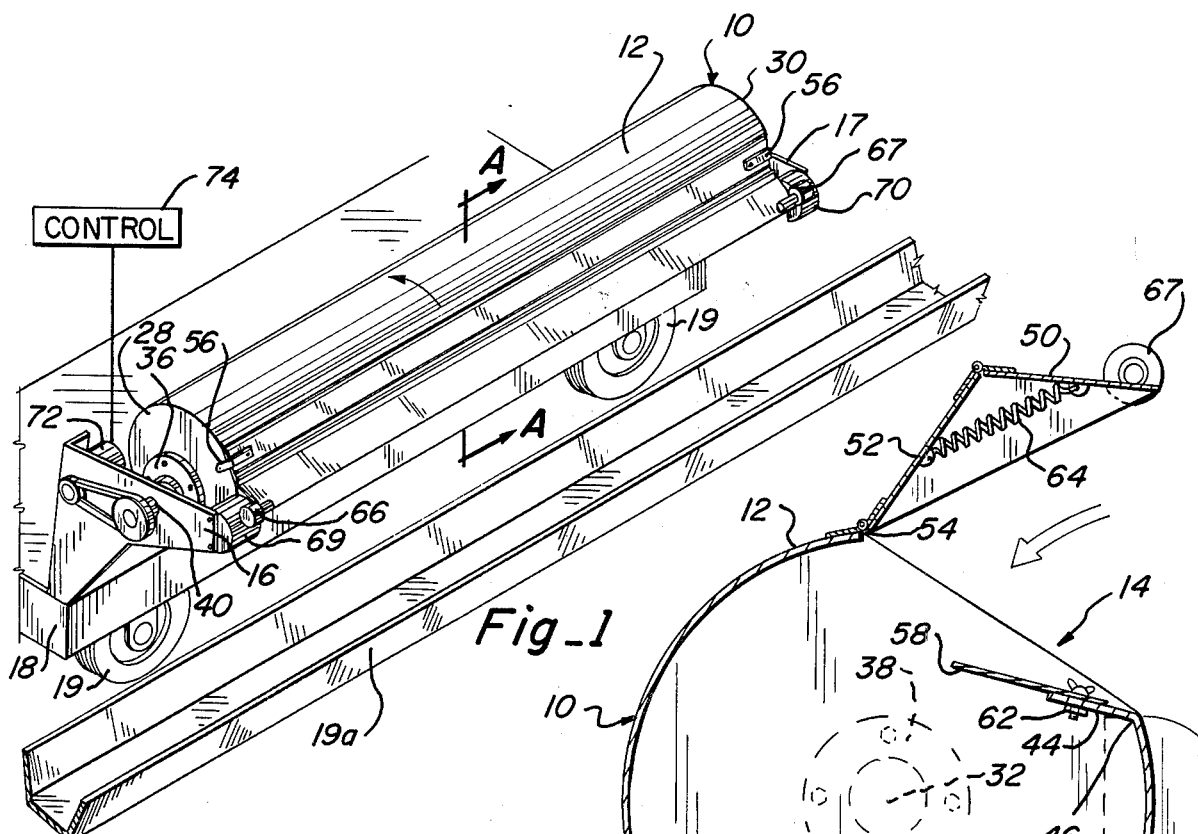
Fig_1
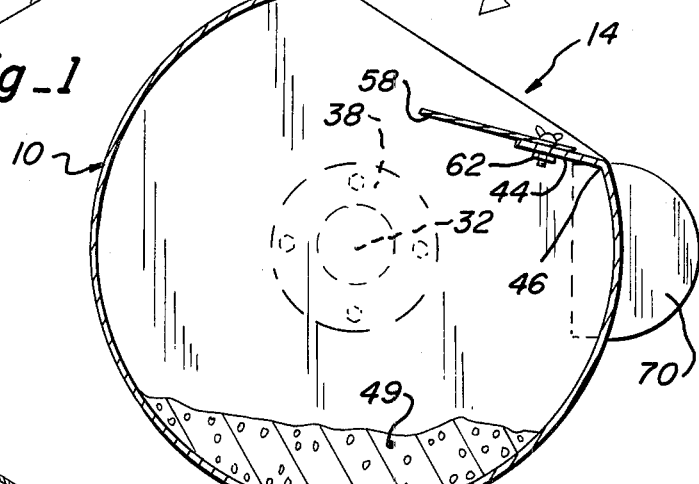
Fig_2
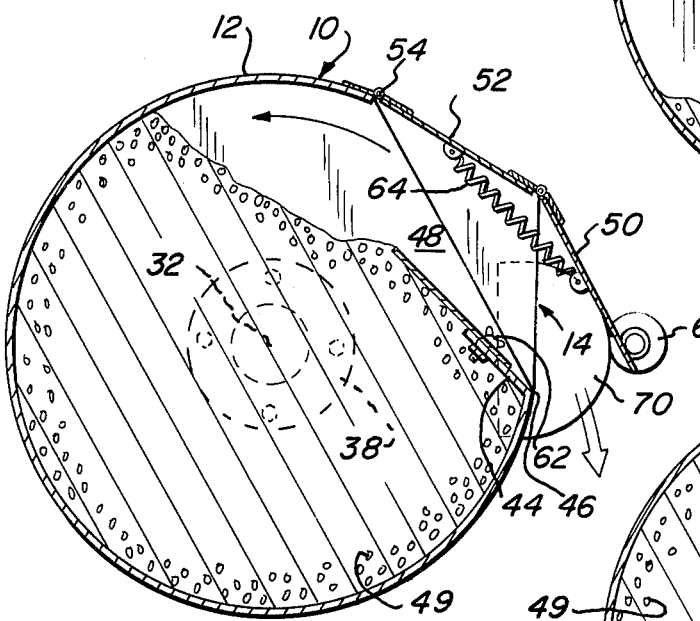
Fig_4
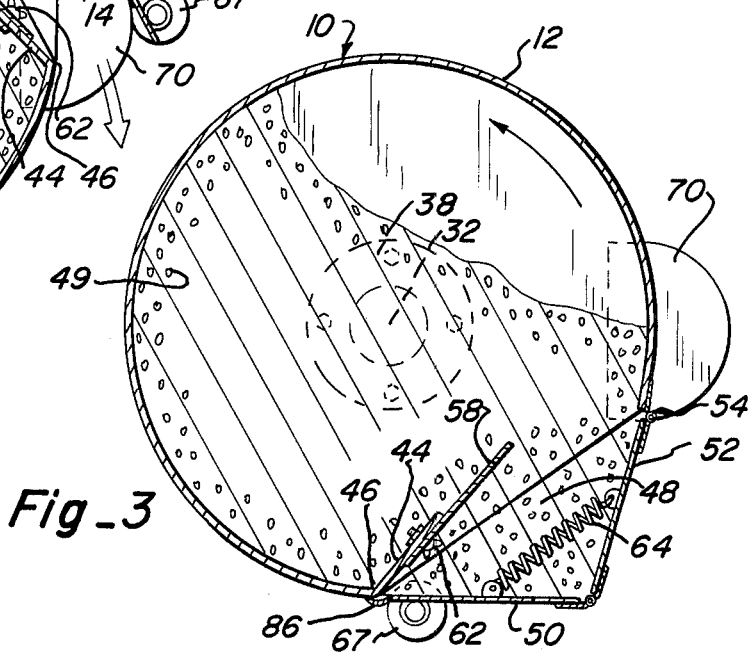
Fig_3

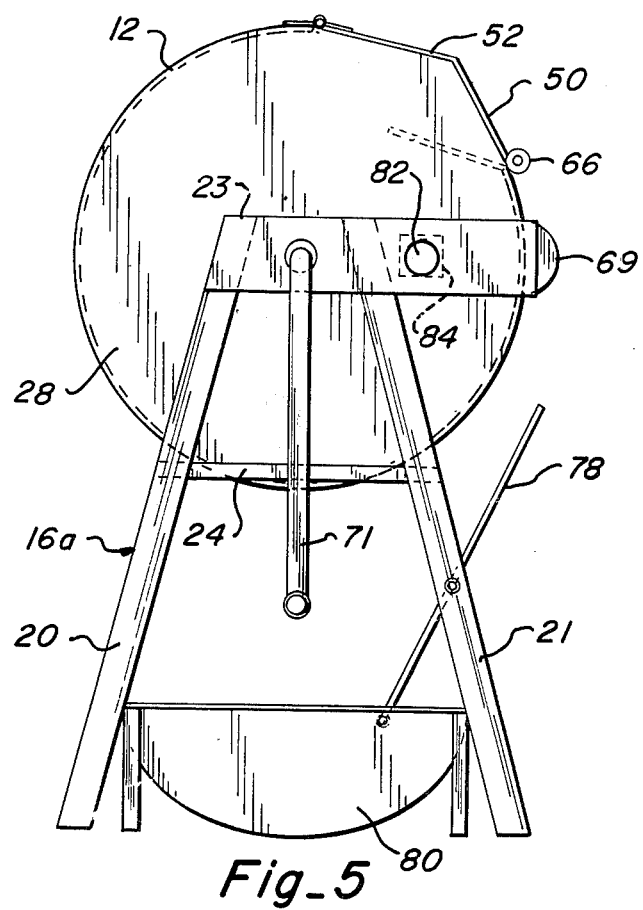
Fig_5
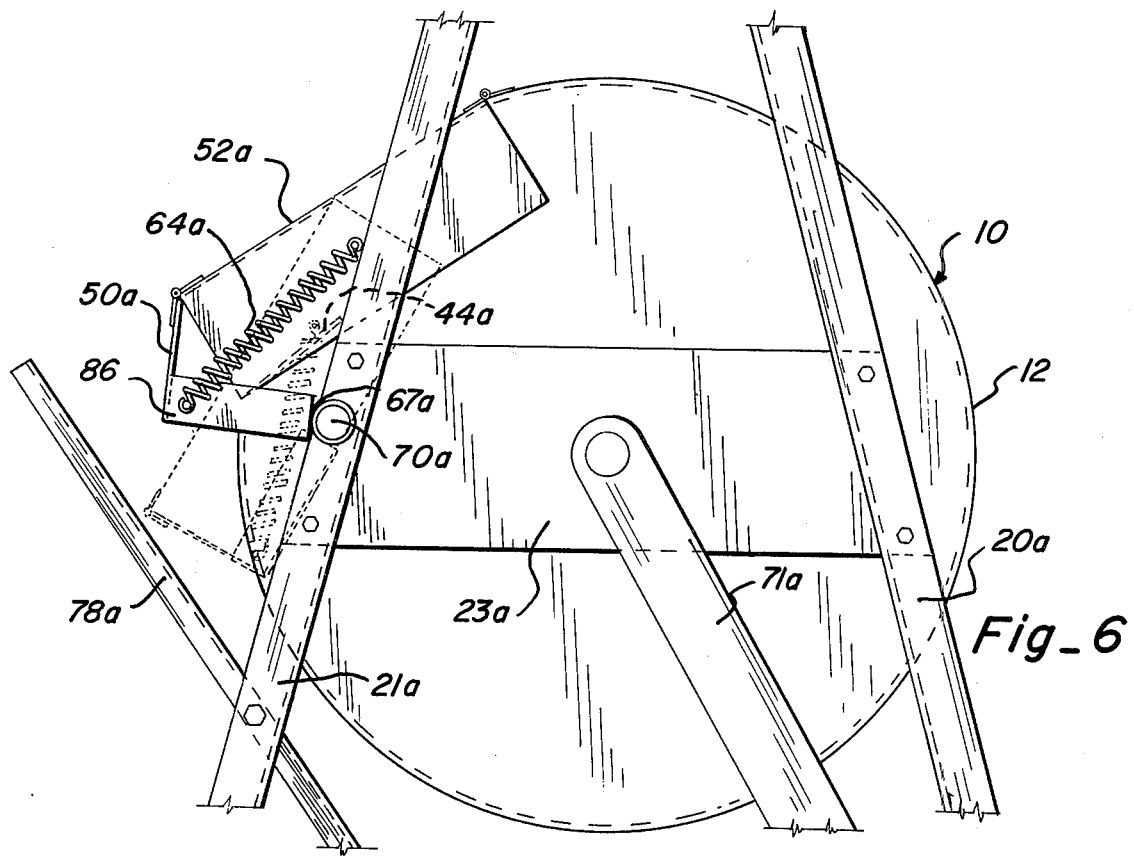
Fig_6

CALIBRATED LIVESTOCK FEEDER

The present invention pertains to a calibrated livestock feeder. More particularly, it relates to a feeder capable of delivering feed in pellet or similar form and in a measured amount.

In the raising of livestock, it often is necessary or desirable to supply the livestock with prepared feed. Such feed may be supplied when the natural grazing area is covered with snow, over-grazed or short of supply by reason of drouth or the like. In some areas of the country, the livestock may be on prepared feed a majority of the months of a year. Even when a certain amount of natural graze is available, it often is desired to supplement the natural ration with prepared feed. In other cases, the livestock may be raised, from the time of weaning until marketing, at least essentially entirely on such feed. The prepared feed typically takes the form of small pellets or cakes of a foodstuff such as dehydrated alfalfa compressed and bound into pellet-like form. Usually, the alfalfa is fortified with vitamins and minerals, as well as with other food material. The pellets frequently have a cross-sectional dimension of about one-fourth to three-fourths of an inch.

Another example in which regular feeding of prepared food is necessary or at least highly desirable is in the raising of fish such as catfish. So-called catfish farms have now existed for some time. The fish are grown in comparatively small ponds at high population density. This becomes commercially feasible only by means of relying almost entirely upon the dispensing into the water of prepared feed.

In many cases for livestock, such pellets are simply strewn manually upon the ground, even though that mode of supplying them to the stock is recognized as resulting in lack of efficiency due to trampling and other loss of the pellets. When the size of the herd to be fed numbers into the thousands, trailer-type vehicles have been utilized for dispensing the pellets from a hopper into an elongated row so that the livestock tend to distribute themselves along the row. Such approaches may lead to serious difficulty, because the livestock may become infected with germs or bacteria carried in or on the soil.

More desirably in many instances, the pellets are placed for feeding into boxes or bins. While that tends to increase the cleanliness and efficiency of consumption, it also increases the cost. Labor is increased when the bins are filled manually. More complex and expensive vehicular-type equipment is required to dispense the pellets from a hopper-type unit. In some cases, attempts have been made to distribute the pellets into different bins or the like by means of augers extending from some kind of hopper arrangement. However, the pellets are comparatively hard and tend to become jammed in the augers.

Whatever the mode of feeding, it also is recognized that the amount of feed to be supplied at any given feeding time ought to be rather carefully measured. With an insufficient per-capita amount of feed, the growth rate of the livestock, of course, is less than desired for maximum production. On the other hand, feeding an excessive amount results in waste inasmuch as the livestock tend to disperse the supplied feed after temporarily becoming satisfied or it remains unconsumed by the livestock at which time it is subject to damage by the elements or loss to the consumption of other animals.

It is, accordingly, a general object of the present invention to provide a new and improved livestock feeder which resolves problems and overcomes difficulties such as those hereinbefore mentioned.

It is another object of the present invention to provide a new and improved livestock feeder which may be fabricated in a durable and rugged form while yet being comparatively inexpensive to manufacture and operate.

A further object of the present invention is to provide a new and improved livestock feeder which is capable of being utilized in as many multiple units as may be needed at any given time to accommodate the size of herd or other population and so that the entire herd may be fed at the same time.

A specific object of the present invention is to provide a new and improved livestock feeder in which the amount of feed to be dispensed for consumption is reasonably accurately, and yet exceedingly simply, adjustable.

In accordance with the present invention, a livestock feeder includes a drum that has a circumferentially-incomplete rigid cylindrical wall together with space-opposed rigid end plates that are affixed across and close opposite ends of the wall. In itself, the wall spans a substantial majority of the circumference of the drum while yet defining a generally rectangular opening in the remainder of the circumference. At respective opposite ends of the drum are a pair of rigid end frames. The drum is carried by the end frame in a manner to revolve about its longitudinal centerline. A generally rectangular shelf is affixed to and projects from one longitudinal side of the opening part way into the interior of the drum. Of a length and width sufficient to close the opening and complete the cylindrical wall is a generally rectangular flap that is hingedly mounted on the other longitudinal side of the opening so as to swing outwardly from the drum. Also included are means for resiliently urging the flap into a position that closes the opening with a force sufficient to effect such closure, against the weight of feed contained in the drum, when the opening is on the underside of the drum during rotation thereof. Finally, the feeder includes cam means carried by at least one of the end frames and disposed in the path of a portion of the flap in a position to cause the latter to swing outwardly from the drum during a limited portion of each one revolution thereof. That limited portion is defined as beginning after the point at which the shelf first slants downwardly toward the opening during rotation of the drum and ending at least by the point at which the shelf then comes into a horizontal position.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a fragmentary perspective view of one embodiment of a livestock feeder;

FIGS. 2 – 4 are enlarged fragmentary cross-sectional views taken generally along the line A—A in FIG. 1 and individually showing a portion of the feeder in respective different positions;

FIG. 5 is an end view of another embodiment of a livestock feeder; and

FIG. 6 is a fragmentary, partially schematic, transverse cross-sectional view of still another embodiment of a livestock feeder.

As specifically embodied herein, a livestock feeder includes a drum 10 that is constructed of a rigid material, such as galvanized sheet iron, to have the qualities of being weather-resistant and durable. So as to be operable by a single individual and yet of sufficient size to handle a number of livestock, drum 10 may be 1 to 3 feet in diameter and between 10 and 20 feet in length. In any event, drum 10 includes a cylindrical wall 12 that is circumferentially incomplete so as to span a substantial majority of the circumference of the drum while yet defining a generally rectangular opening 14 in the remainder of the circumference.

A pair of rigid end frames 16 and 17 are disposed at respective opposite ends of drum 10. In the form as shown in FIG. 1, end frames 16 and 17 project upwardly and to one side of a carriage 18 that has wheels 19 designed to ride alongside an elongated feed bin 19a. This form is intended for use in distributing pellets in an elongated row. In the form of FIGS. 5 and 6, however, the feeder may be stationary. Thus in FIG. 5, for example, each end frame, such as frame 16a is generally A-shaped, including legs 20 and 21 rigidly spaced by means of upper and intermediate cross ties or plates 23 and 24, respectively. Rigidly securing end frame 16a to its mate at the other end of drum 10 are suitable longitudinal ties. Moreover, any of the embodiments may be carried on the bed of a wagon, truck or other vehicle.

The opposite ends of drum 10 are closed by respective end plates 28 and 30 affixed thereacross. Drum 10 includes means carried by end frames 16 and 17 for supporting it to revolve about its longitudinal centerline 32. While this may take the form of rollers upon which the underside of the drum rests or an axle which extends the entire length of the drum along its centerline, the illustrated embodiments have hubs 36 and 38 from which corresponding axles 40 project outwardly from end plates 28 and 30 and are journeled in the respective end frames.

A generally rectangular shelf 44 is integrally affixed to and projects from one longitudinal side 46 of opening 14 part way into the interior of drum 10. As shown, the direction of projection of shelf 44 is such as to define a more or less acute angle with respect to the opposite side of opening 14 and thus defines what amounts to a dispensing cup 48 in which a measured amount of feed 49 is to be captivated during each revolution of drum 10. Also of generally-rectangular shape is a flap 50 of a length and width sufficient to close opening 14 and thus complete the cylindrical wall of drum 10. Flap 50 is hingedly mounted on the longitudinal side of opening 14 opposite side 46 so as to swing outwardly from drum 10.

A similarly rectangular segment 52 forms a limited circumferential extent or section of wall 12 immediately adjacent to the side of opening 14 opposite side 46. The far side 54 of segment 52 is hingedly mounted upon the remainder of wall 14 so as to swing outwardly from drum 10 and thereby create what constitutes a widthwise increase in the effective size of opening 14.

Latches 56, respectively coupled between end plates 28 and 30 and the corresponding ends of segment 52, serve to permit releasable latching of segment 52 in place between the respective peripheries of end plates 28 and 30 as an effective continuation of wall 12.

In the version of FIG. 1, flap 50 is hinged to segment 52 which, in turn, is hinged to the remainder of wall 12. Thus, flap 50 may be swung outwardly while segment 52 is held in a closed position by latches 56. Release of latches 56 permits segment 52 also to be swung outwardly. In the version of FIG. 5, however, flap 50 is integral with, or at least fixedly secured to, segment 52. In this latter case, flap 50 and segment 52 swing outwardly together and, if desired, latches 56 may be omitted. In either case, all hinge connections and the junction between flap 50 and side 46 of opening 14 preferably include a sealing element, as at 86, to prevent the entrance of moisture when flap 50 is closed.

Again of generally rectangular shape is a panel 58 that is disposed adjacent and parallel to shelf 44 and is of a length so as to constitute an extension of that shelf. Mutually related slots respectively in shelf 44 and panel 58, as part of fasteners 62, constitute means for adjustably securing panel 58 to shelf 44 so as to enable adjustment of the amount by which panel 58 extends interiorly of drum 10 beyond the inward edge of shelf 44.

Springs 64, secured at longitudinally spaced points between flap 50 and segment 52 in FIGS. 1 – 4 or wall 12 in FIG. 5, resiliently urge flap 50 into a position that closes opening 14 with a force sufficient to effect such closure of the opening as against the weight of feed pellets contained in drum 10 when the opening is on the underside of the drum during rotation thereof. Projecting lengthwise outwardly from flap 50 are cam followers 66 and 67 at the corresponding opposite ends of flap 50. Followers 66 and 67 are respectively engagable with cams 69 and 70 individually carried by respective ones of end frames 16 and 17 so as to be in the path of followers 66 and 67 in a position to cause flap 50 to swing outwardly from drum 10 during a limited portion of each one revolution of the drum. That limited portion of its period of revolution begins after the point at which shelf 44 first slants downwardly toward opening 14 during rotation of the drum and ends at least by the point at which shelf 44 then comes into a horizontal position. The referenced direction of rotation is counter-clockwise as indicated by appropriate arrows in the drawings. Alternatively, the feeder may be arranged for clockwise rotation.

In its simplest form, drum 10 may be driven in rotation by means of a manually operated hand crank 71 coupled to axle 40 as exemplified in FIG. 5. In FIG. 1, drum 10 is driven so as to revolve about its centerline by an electric motor 72 regulated as to speed of rotation by a control unit 74. The driving connection between motor 72 and drum 10, and even the function of control unit 74 if desired, may be implemented by incorporation of a speed reducer or so-called gear motor. A spring-loaded solenoid activator and stop may be included.

In use, drum 10 is first filled with livestock feed pellets 49. In FIG. 1, this preferably is achieved by releasing latch 56 so as to permit both flap 50 and segment 52 to be swung outwardly and thereby expose an enlarged opening. Thereafter, segment 52 is secured in place, as an extension of wall 12, by means of latch 56. In FIG. 5, flap 50 and segment 52 are swung outwardly as an integral unit. During rotation or revolution of drum 10 about its axis, cup 48 becomes filled with feed pellets at a time when flap 50 generally is positioned at the underside of the drum and the inward end of shelf 44 passes beyond a vertical position. As drum 10 continues in its rotation, shelf 44 has captivated a predetermined amount of the feed in the area defined by cup 48. Of course, the amount of feed captivated is determined by the amount by which the shelf is effectively interiorly extended by adjustment of the position of panel 58. When shelf 44 swings past its upright vertical position, such captivation is complete. Thereafter, cams 69 and 70 force flap 50 to swing outwardly whereupon the captivated portion of feed is permitted to discharge, by gravity, downwardly and outside of drum 10. Alternatively or in addition to the calibration of the amount of feed to be dispensed on each revolution by adjustment of the degree of inward extension of panel 58, control 74 may be varied so as to change the speed of drum revolution. The latter also may be a determinant of feed rate both by limiting the period of time during which cams 69 and 70 force flap 50 to remain open and the time period during which pellets contained within drum 10 are able to be captivated by cup 48.

In a rather simple but yet convenient implementation, the embodiment of FIG. 5 includes a rigid sheet 78 that is coupled between end frame 16a and its mate at the other end of drum 10. Sheet 78 is secured in a position beneath the location of flap 50 when the latter is operated upon by cams 69 and 70. Sheet 78 is inclined downwardly toward a location below the bottom of drum 10 so as to serve to deflect the dispensed feed pellets to a location beneath the drum. Sheet 78 also serves to prevent the livestock from having access to the feed as it is dispensed or from catching their noses or tongues as flap 50 closes. Conveniently, then, a feed bin or box 80 is located on the ground or other supporting surface below drum 10 and between the end frames.

Preferably added to the assembly is a stop that secures drum 10 against rotation at a point when the drum is positioned with flap 50 generally in an upper position so as not to be dispensing the feed, that is, when flap 50 is disengaged from cams 69 and 70. This secures against a possible tendency by the livestock to learn to rotate drum 10, as with their noses, and thus cause it to dispense the feed at times when not desired. As shown in FIG. 5, a stop 82 thus includes a latch pin engageable with a block 84 affixed to end plate 28 of the drum for the purpose of preventing rotation of the drum when not desired.

FIG. 6 illustrates a simple and inexpensive cam system which was proved to be effective. Similar to FIG. 5, drum 10 is journaled for rotation, by a crank 71a, from cross-plates 23a affixed on legs 20a and 21a. Generally as in FIGS. 1 - 4, the opening in wall 12 is closed by a flap 50a hinged to a segment 52a that, in turn, is hinged to the far edge of the opening. A spring 64a biases flap 50a toward the closed position. A shelf 44a projects inwardly from the other edge of the opening.

In FIG. 6, the closure parts are shown in solid line for the open position and in dashed line for the closed position. A stud 70a projects from leg 21a to serve as the cam, and an end surface 67a on a finger 86 serves as the cam follower. Finger 86 projects inwardly from one end of flap 50a. Stud 70a is disposed so as to be in the path of end surface 67a as drum 10 approaches the dispensing position. On contact with stud 70a, finger 86 simply swings around the stud as the drum continues to rotate, and that movement of finger 86 serves to force flap 50a outwardly. Preferably, such a finger and stud combination are included at each end of flap 50a. As explained in connection with FIG. 1, segment 52a preferably is latched to the drum wall, so as to be in a closed position, during feeding.

As primarily contemplated with the embodiments of FIGS. 5 and 6, a plurality of livestock feeders as described herein are placed end-to-end with each being above a suitable feedbox. Such orientation distributes the livestock naturally among the different bins. As determined by the operator, the feed rate is adjusted so as to achieve proper economy of usage coupled with the promotion of maximum growth rate. Alternatively, the illustrated feeder may be mounted on a suitable wagon or trailer so as to be propelled over the ground and distribute the feed, either by means of deflection to the outside of the trailer or through an opening in the underside thereof, in an elongated row. In the somewhat different environment of feeding the likes of fish or other marine product, the feeders may be disposed on a high bank and coupled with suitable deflectors or mounted upon a floating structure. In any event, it will be observed that only comparatively simple fabrication is required in order to achieve a feeder which is economical and in its initial procurement and yet highly capable of accomplishing its task with a minimum of supervision, adjustment and control.

While particular embodiments of the present invention have been shown and described, and various alternatives and modifications have been mentioned, it will be obvious to those skilled in the art that changes and other modifications may be made without departing from the invention in its broader aspects, and, therefore, the aim in the appended claims is to cover all such changes and modifications as fall within the true spirit and scope of the invention.

I claim:
1. A livestock feeder comprising:
   a drum having a circumferentially incomplete rigid cylindrical wall and space-opposed rigid end plates affixed across and closing opposite ends of said cylindrical wall, said wall spanning a substantial majority of the circumference of said drum while defining a generally rectangular opening in the remainder of said circumference;
   a pair of rigid end frames individually disposed at respective opposite ends of said drum;
   means carried by said end frames for supporting said drum to revolve about its longitudinal centerline;
   a generally rectangular shelf affixed to and projecting from one longitudinal side of said opening part way into the interior of said drum;
   a generally rectangular flap of a length and width sufficient to close said opening and complete said cylindrical wall, said flap being hingedly mounted on the other longitudinal side of said opening to swing outwardly from said drum;
   means for rotating said drum about said centerline and in a direction such that said one side of said opening lags the other;
   means for resiliently urging said flap into a position closing said opening with a force sufficient to effect such closure of said opening, against the weight of feed contained in said drum, when said opening is on the underside of said drum during rotation thereof;

and cam means carried by at least one of said end frames and effectively disposed in the path of a portion of said flap in a position to cause the latter to swing outwardly from said drum during a limited portion of each one revolution of said drum beginning after the point at which said shelf first slants downwardly toward said opening during rotation of said drum and ending at least by the point at which said shelf then comes into a horizontal position.

2. A feeder as defined in claim 1 in which said supporting means further includes:

axle means projecting outwardly from each of said end plates in alignment with said longitudinal centerline;

and bearing means for enabling support of said axle means on said end frames and rotation of said drum around the axis of said axle means.

3. A feeder as defined in claim 1 in which said flap includes a cam follower projecting longitudinally outwardly beyond one of said end plates, and said cam means includes a camming element mounted on the adjacent one of said end frames in the path of said cam follower.

4. A feeder as defined in claim 3 in which said cam follower includes at least one finger projecting inwardly from one end of said flap, and in which said camming element includes a stud disposed in the path of the inner end of said finger as said drum approaches said limited portion of revolution and arranged so that said inner end and said finger swing around said stud, during said limited portion, to force said flap outwardly and away from said opening.

5. A feeder as defined in claim 1 which further includes a carriage movable over the ground, and in which said end frames are mounted on said carriage.

6. A feeder as defined in claim 1 which further includes a generally rectangular panel disposed adjacent and parallel to said shelf and of a length to constitute an extension of said shelf, and means for adjustable securing said panel to said shelf to enable adjustment of the amount by which said panel extends interiorly of said drum beyond the inward edge of said shelf.

7. A feeder as defined in claim 1 which further includes means for adjustably determining the amount of feed, contained within said drum, captivated by said shelf during each revolution of said drum.

8. A feeder as defined in claim 7 in which a motor is coupled in rotationally driving relationship to said drum, and in which said determining means includes a control for varying the effective speed of said motor.

9. A feeder as defined in claim 1 which further includes a generally rectangular rigid sheet coupled between said end frames in a position beneath the location of said flap when in engagement with said cam means and inclined downwardly toward a location generally beneath said centerline.

10. A feeder as defined in claim 1 which further includes a generally rectangular segment of said wall of limited circumferential extent around said drum and immediately adjacent to said other longitudinal side of said opening;

means for hingedly mounting the longitudinal side of said segment, opposite the longitudinal side thereof adjacent to said opening, on the remainder of said wall to swing outwardly from said drum and thereby create a widthwise increase in the effective size of said opening;

and means for releasably latching said segment in place between the respective peripheries of said end plates as an effective continuation of said wall.

11. A feeder as defined in claim 1 which further includes closure means effective to form a part of said wall but movable to establish an additional opening through which feed may be loaded into said drum, and means for releasably securing said closure means in place as said part of said wall.

12. A feeder as defined in claim 1 which further includes means for selectively securing said drum against rotation with said drum rotationally in a position in which said flap is disengaged from said cam means.

* * * * *